United States Patent [19]

Ciman

[11] 4,278,894
[45] Jul. 14, 1981

[54] WIND-DRIVEN POWER GENERATOR

[76] Inventor: Gelindo Ciman, Via Prova 1, San Bonifacio/Verona, Italy

[21] Appl. No.: 965,725

[22] Filed: Dec. 1, 1978

[30] Foreign Application Priority Data

Dec. 16, 1977 [IT] Italy ............................... 69812 A/77

[51] Int. Cl.³ .............................................. F03D 9/00
[52] U.S. Cl. ....................................... 290/44; 290/55; 416/108
[58] Field of Search ...................... 290/44, 55; 416/23, 416/24, 108

[56] References Cited

U.S. PATENT DOCUMENTS

| | | |
|---|---|---|
| 1,772,119 | 8/1930 | Van Lammeren ................... 416/108 |
| 3,743,848 | 7/1973 | Strickland .......................... 290/44 X |
| 3,793,530 | 2/1974 | Carter .................................... 290/55 |
| 4,134,708 | 1/1979 | Brauser et al. ..................... 290/55 X |

OTHER PUBLICATIONS

"Wind Machines", A National Science Foundation Report by F. R. Eldridge, Oct. 1975, p. 25.

Primary Examiner—J. V. Truhe
Assistant Examiner—W. E. Duncanson, Jr.
Attorney, Agent, or Firm—Pollock, Vande Sande & Priddy

[57] ABSTRACT

A wind-driven power generator comprising a plurality of blades mounted between a pair of spoked wheels on a vertical column, said blades being connected through an eccentric rod system to a vane for detecting the direction of the wind and positioning the blades so that at least one blade on one side of said column is directed perpendicularly to the direction of the wind whereas the blade or blades on the opposite side of said column are directed parallel to the direction of the wind.

4 Claims, 3 Drawing Figures

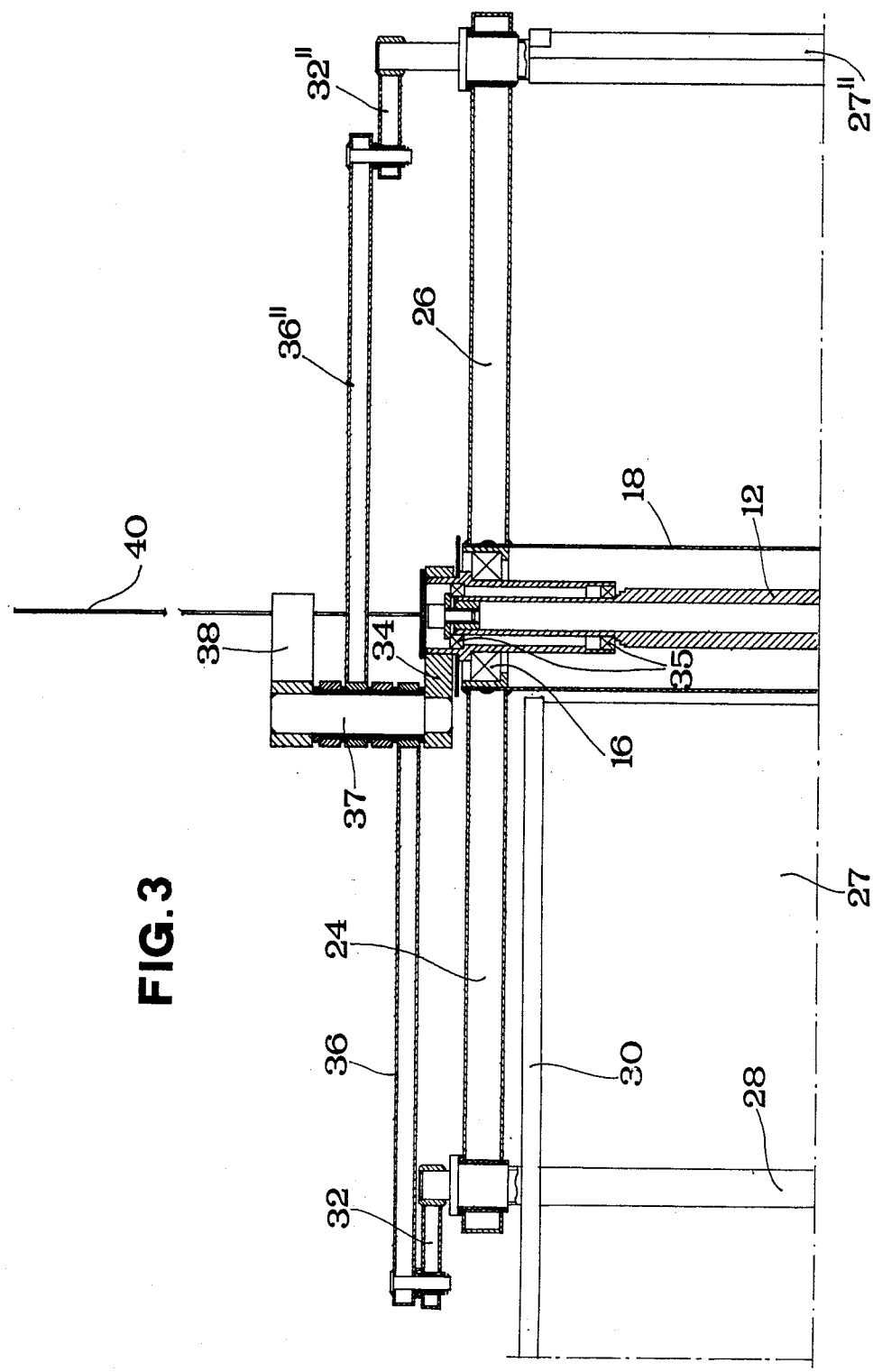

WIND-DRIVEN POWER GENERATOR

This invention relates to a wind-driven power generator.

It is known to produce power by utilizing the force of the wind by means of a propeller arranged with its axis of rotation in the flow direction of the wind. To enable the propeller to follow the direction of the wind, it is also known to mount the propeller support for rotation about a vertical axis and to provide the propeller support with deflector blades to sense the direction of the wind.

However, these known wind-driven power generators have certain disadvantages which are well known. First of all, the cantilever arrangement of the propeller blades is an impediment to increasing the size of the propeller when the power produced by the generator is to be increased, considering also that the blades must be of light weight and sufficiently sturdy to be able to resist to heavy winds. This has always limited the use of this type of generators to applications where only little power is required, such as for household use in isolated houses.

Secondly, as the propeller support had to be mounted for rotation about a vertical axis, it was difficult to transmit the movement from the propeller to a fixed machine so that the latter, which usually was an electric power generator, normally had to be mounted directly on the rotary support. This makes the propeller support heavy and sets a limit to the power that can be obtained from such a generator.

It is an object of the present invention to provide a wind-driven power generator that can be constructed in large size to produce high power and which does not have the aforementioned disadvantages, in particular permits the construction of large propeller blades without the limitations inherent in the use of a propeller, which does not require the entire power generating assembly to be oriented according to the wind direction and finally permits the machine using the mechanical power to be mounted in a fixed position with respect to the ground. This results in numerous advantages such as lower cost of the apparatus for the same power produced, easier installation and maintenance of the driven machine and other advantages which will become apparent from the following detailed description.

These objects are achieved according to the invention by providing a wind-driven power generator which comprises a pair of spoked wheels provided with a plurality of identical spokes and mounted coaxially on a rotary support for rotation about a vertical axis, with a plurality of blades each rotatably mounted between the distal ends of each pair of spokes and positioning means for rotating each blade from a radial position to a tangential position during half a revolution of said spoked wheels about their axis, and from the tangential position back to the radial position during the next half revolution, so that the wind will hit each blade in a perpendicular direction when the blade is in the radial position.

A preferred embodiment of the invention will now be described by way of example and with reference to the accompanying drawings, in which:

FIG. 3 is a view of a detail of FIG. 2 on a larger scale.

Figure 1:
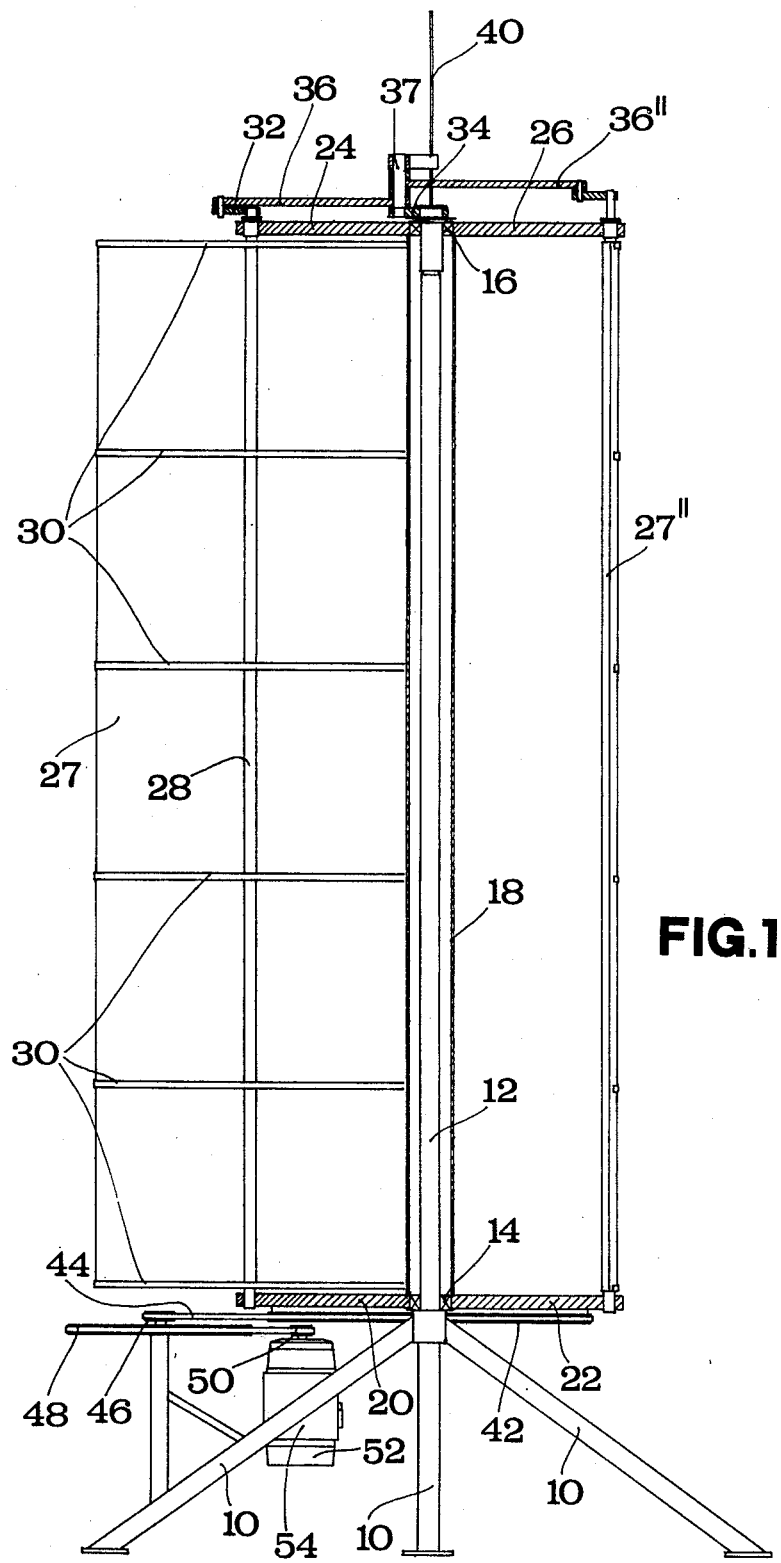
FIG. 1 is a side view of a wind-driven power generator according to the invention.

As shown in FIG. 1, a wind-driven power generator according to the preferred embodiment of the invention comprises a pedestal formed of four legs 10 adapted to be secured to a fixed base and converging toward a common top from which a fixed vertical column 12 extends upwardly. Rotatably mounted on the column 12 by means of bearings 14 and 16 is a hollow shaft 18 at the opposed ends of which a pair of spoked wheels having spokes 20, 22 and 24, 26, respectively, is firmly secured.

Rotatably mounted between the distal ends of corresponding spokes 20, 24 of the pair of spoked wheels is a blade 27 preferably formed by a central shaft 28 supporting a framework of transverse members 30, and by a coating 31 of a substantially airtight sheet or fabric. The shaft 28 is mounted for free rotation on bearings at the distal ends of the spokes 20, 24 and projects upwardly from the spoke 24 where a crank 32 is firmly secured thereto. Similar blades 27', 27" and 27''' are mounted between each pair of corresponding spokes 22, 26 of the spoked wheels.

As more clearly seen in FIG. 3, an eccentric cam 34 is rotatably supported by means of bearings 35 at the upper end of the column 12 and carries a pin 37 from which four connecting rods 36, 36', 36" and 36''' extend outwardly to the distal ends of the cranks 32, 32', 32" and 32''', respectively. Further, a rod 38 extends from the eccentric cam 34 and carries at its free end a deflector vane 40 for detecting the direction of the wind and positioning the eccentric cam perpendicularly to the direction of the wind.

Figure 2:
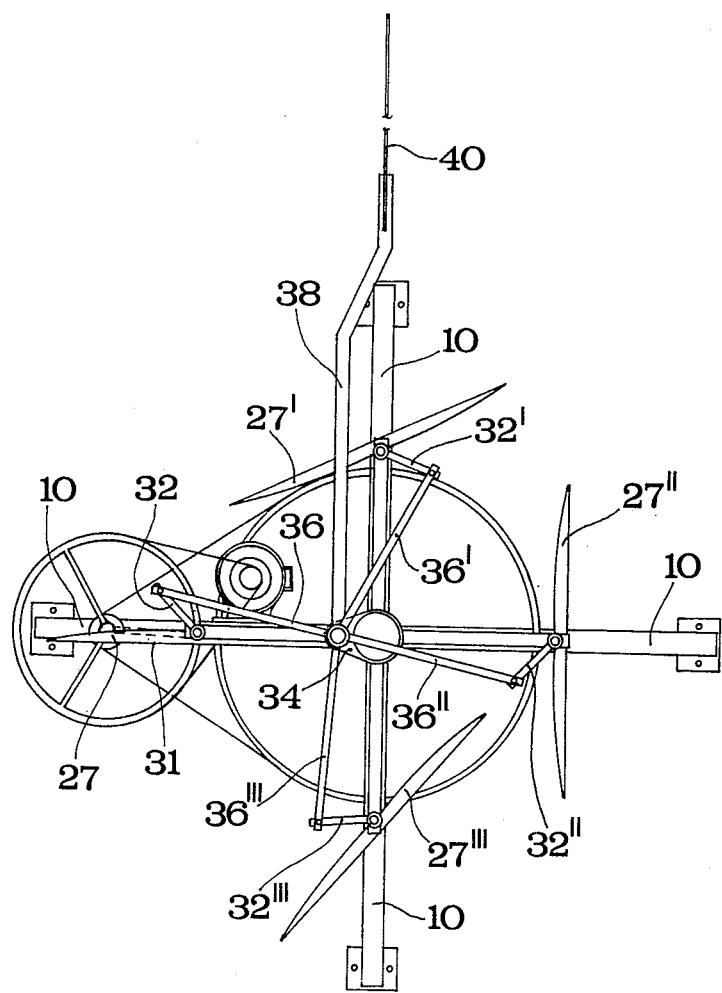
FIG. 2 is a top plan view of the power generator of FIG. 1.

As shown in FIG. 2, the cranks 32, 32' etc. are arranged at an oblique angle to the plane of the blades 27, 27' etc. and the assembly formed by the eccentric cam 34, connecting rod 36 and crank 32 comprises a linkage means which is so constructed that from a given position of the eccentric cam 34 each blade will move from a radial position relative to the axis of the spoked wheels, occupied by the blade 27 in FIG. 2, to the tangential position occupied by the blade 27" to finally return to the radial position again at the end of each complete revolution of the spoked wheels. The deflector vane 40 is so arranged in relation to the eccentric cam 34 that each blade will occupy the radial position or tangential position, respectively, at such points during the rotation of the spoked wheels that the wind will blow perpendicularly on the blade in the radial position and parallel to the blade in the tangential position. In this manner a dissymmetry is produced in the positioning of the blades so that the force of the wind will act thereon only in a direction tending to promote rotation of the spoked wheels in a given direction whereas the action of the wind is practically zero in those portions of the path of movement of each blade where the wind would interfere with the rotation of the spoked wheels. This result is obtained by the simple mechanism controlled by the deflector vane 40 and comprising the eccentric cam, connecting rod and crank.

For large plants and particular requirements it would also be possible to detect the direction of the wind by an anemometer connected to a known servomechanism for rotating the eccentric cam 34 into the respective required position.

It will thus be evident that the main structure of this wind-driven power generator does not have to be turned according to the direction of the wind. Adaptation to the direction of the wind is limited to the positioning of the blades which are supported at their ends and move about their longitudinal axis. Thus they are not subjected to high stress and can be of light weight although sturdy.

As shown in FIG. 1, for utilization of the power produced by the blades, a pulley 42 is firmly secured to the lower spoked wheel 22 and drives a transmission belt 44 which in turn drives a second pulley 46 with a high transmission ratio. Firmly connected to the pulley 46 is a third pulley 48 which drives a pulley 50 of an electric power generator 52 mounted in a fixed position on a bracket 54 secured to the pedestal 10. Of course, if the rotary movement of the pulley 42 is to be used directly for driving machines and the like, the power user may be some machine other than the electric generator 52.

Although a preferred embodiment of the invention has thus been described in detail and illustrated in the accompanying drawings, it is to be understood that the invention is not limited to this precise embodiment and that numerous changes and modifications obvious to one skilled in the art may be made therein without departing from the scope of the invention as defined by the appended claims.

I claim:

1. A wind-driven power generator comprising a pair of wheels mounted coaxially on a support for rotation about a vertical axis; a plurality of blades, each blade being rotatably mounted on a shaft extending between said wheels; and linkage means operatively connected between a point located on said support, eccentric to said vertical axis, and said shaft of each of said blades, for forcing each blade to rotate from a radial position to a tangential position during half a revolution of said wheels about said axis, and from said tangential position back to said radial position during the next half revolution.

2. A wind-driven power generator comprising a pair of wheels mounted coaxially on a support for rotation about a vertical axis; a plurality of blades, each blade being rotatably mounted on a shaft extending between said wheels; and linkage means operatively connected between said support and said shaft of each of said blades, for forcing each blade to rotate from a radial position to a tangential position during half a revolution of said wheels about said axis, and from said tangential position back to said radial position during the next half revolution, said linkage means comprising a plurality of cranks each firmly secured to said shaft of one of said blades, and a plurality of connecting rods each extending from an end of said cranks to a point common to all of said connecting rods, said point being located eccentrically relative to the axis of said wheels.

3. A wind-driven power generator comprising a pair of wheels mounted coaxially on a support for rotation about a vertical axis; a plurality of blades, each blade being rotatably mounted on a shaft extending between said wheels; positioning means for rotating each blade from a radial position to a tangential position during half a revolution of said wheels about said axis, and from said tangential position back to said radial position during the next half revolution, said positioning means comprising a plurality of cranks each firmly secured to said shaft of one of said blades, and a plurality of connecting rods each extending from an end of said cranks to a point common to all of said connecting rods, said point being located eccentrically relative to the axis of said wheels and being formed by a pin eccentrically mounted on a member supported for free rotation on said axis, said pin being provided with deflector means responsive to the direction of the wind.

4. A wind-driven power generator as claimed in claim 3, wherein said deflector means comprises a rod extending perpendicularly from said pin and carrying a deflector vane at its free end.

* * * * *